C. H. VAN ASPEREN.
AERIAL LIFTING DEVICE.
APPLICATION FILED MAY 6, 1918. RENEWED SEPT. 23, 1920.
1,374,256.
Patented Apr. 12, 1921.
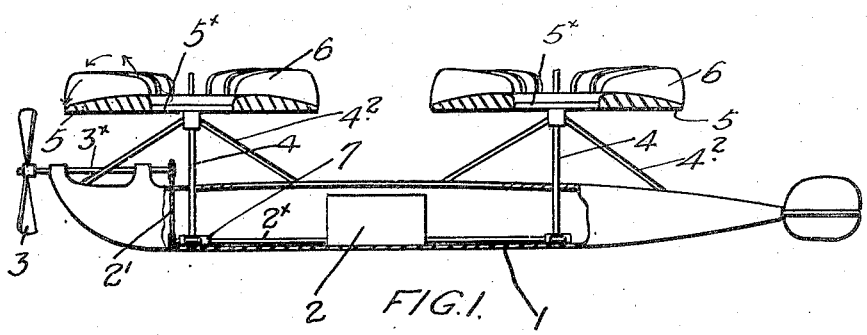
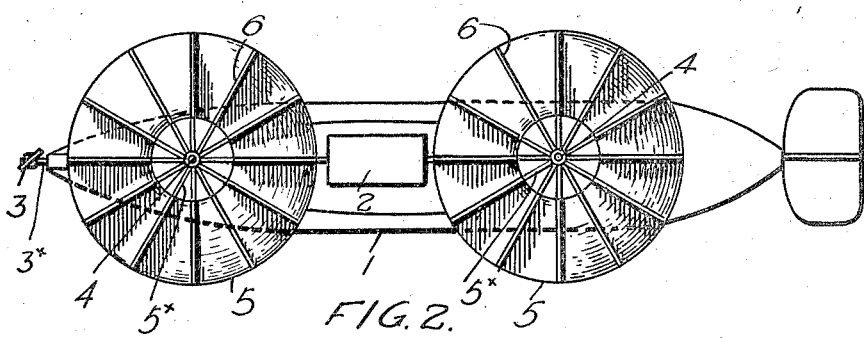
INVENTOR
CORNELIS H. VAN ASPEREN

UNITED STATES PATENT OFFICE.

CORNELIS HENDRICK VAN ASPEREN, OF TORONTO, ONTARIO, CANADA.

AERIAL LIFTING DEVICE.

1,374,256.

Specification of Letters Patent.

Patented Apr. 12, 1921.

Application filed May 6, 1918, Serial No. 232,985. Renewed September 23, 1920. Serial No. 412,412.

*To all whom it may concern:*

Be it known that I, CORNELIS HENDRICK VAN ASPEREN, of the city of Toronto, in the county of York, in the Province of Ontario, Canada, have invented certain new and useful Improvements in Aerial Lifting Devices, of which the following is the specification.

My invention relates to improvements in aerial lifting devices for aerial vehicles and the object of the invention is to devise simple means by which a direct vertical lift can be given to an aerial vehicle and it consists of an annular rotatable member carried preferably in a horizontal position and suitably driven having approximately radial vanes extending from the face of such member and adapted to impel the air outward centrifugally, the upper face of the member being so formed as to recede from the resulting air flow thus producing a rarefied air space between the inner and outer edges of the member as hereinafter more particularly explained.

The aerial lifting device should be applicable to a great variety of aerial vehicles. One of such applications is illustrated in a general way by the following views in which, Figure 1, is a side elevation of an aerial vehicle partially in section showing my lifting device in section applied thereto.

Fig. 2, is a plan view of the parts shown in Fig. 1.

In the drawings like characters of reference indicate corresponding parts in the various figures.

1 indicates an aerial vehicle body provided with an engine 2 and propeller 3 driven from the engine shaft 2ˣ by means of the sprocket drive 2′ connecting the engine shaft 2ˣ to the propeller shaft 3ˣ. 4 indicate vertical shafts supported in proximity to their upper ends in bearings 4ˣ and at their lower ends in suitable step bearings formed in the bottom of the aerial vehicle body. The bearings 4ˣ are supported by suitable portions 4². 5 indicates an annular member with a central opening connected to the shaft 4 by spokes 5ˣ. The upper face of the member 5 is formed with a curved or cambered surface 5′, being similar in form in cross section to the cross section of an ordinary plane of an aerial vehicle. 6 indicates a series of vanes which extend upward from the upper face of the member 5 radially at suitable distances apart. The shaft 4 is rotated by any suitable driving means from the shaft 2ˣ such as a worm drive 7. The members 5 are rotated at a high rate of speed the vanes 6 carried thereby tending to impel the air centrifugally outward at high velocity. As the air passes from the open center of the annular member 5 and contacts with the cambered surface it is directed upwardly as indicated by arrow Fig. 1, in an arc-shaped direction thereby drawing the air from the upper surface 5′ of the member 5 so as to form a rarefied air space or partial vacuum between the inner and outer edges of such member within the air flow as indicated by the aforesaid arrow and over the upper active surface of such member. By this means an inequality of pressure is produced between the upper and lower faces of the member 5, the pressure upon the lower face being of course greater than that on the upper face and, therefore, producing a lifting action, raising the aerial vehicle vertically.

In the drawing I have shown the lifting device located in proximity to the front and back of the aerial vehicle so as to give an equal lift throughout. It will, of course, be understood that any number of these devices may be employed arranged as desired.

From this description it will be seen that I have devised a very simple device which will provide a direct upward lift in an aerial vehicle, which upward lift is produced by impelling the air centrifugally over a warped surface and thereby reducing the air pressure on the upper or active surface of the element as compared to the pressure against the lower face of the element.

What I claim as my invention is:

An aerial lifting device comprising an annular element rotatably mounted upon a vertical axis and having its upper surface curved outwardly and downwardly from its inner portion to its outer edge, and vertically disposed radial vanes carried by said upper surface and projecting upwardly therefrom and extending from said inner portion to said outer edge having free upper edges exposed to the atmosphere.

CORNELIS HENDRICK VAN ASPEREN.

Witnesses:
M. EGAN,
F. GORE.